United States Patent [19]

Nakamura et al.

[11] Patent Number: 5,180,780
[45] Date of Patent: Jan. 19, 1993

[54] RUBBER-MODIFIED STYRENE-BASED COPOLYMER

[75] Inventors: Shinichi Nakamura, Sodegaura; Yutaka Tubokura, Ichihara; Eiichi Terada, Urayasu, all of Japan

[73] Assignee: Idemitsu Petrochemical Company Limited, Tokyo, Japan

[21] Appl. No.: 877,375

[22] Filed: Apr. 29, 1992

Related U.S. Application Data

[63] Continuation of Ser. No. 460,266, Jan. 2, 1990, abandoned.

[30] Foreign Application Priority Data

Jan. 12, 1989 [JP] Japan ................................ 1-3737

[51] Int. Cl.⁵ ............... C08L 53/02; C08L 33/20; C08L 25/12; C08L 53/00
[52] U.S. Cl. ..................... 525/96; 525/238; 525/241
[58] Field of Search ................ 525/96, 238, 241

[56] References Cited

U.S. PATENT DOCUMENTS

| | | | |
|---|---|---|---|
| 3,491,166 | 1/1970 | Childers et al. | 525/96 |
| 3,526,606 | 9/1970 | Minekawa et al. | 525/96 |
| 3,676,527 | 7/1972 | Babcock, Jr. et al. | 525/96 |
| 3,907,931 | 9/1975 | Durst | 525/98 |
| 4,748,203 | 5/1988 | van Abeelan et al. | 525/67 |
| 4,771,107 | 9/1988 | Hoenl | 525/86 |
| 4,839,418 | 6/1989 | Schwaben et al. | 525/98 |

Primary Examiner—James J. Seidleck
Assistant Examiner—W. R. H. Clark
Attorney, Agent, or Firm—Wyatt, Gerber, Burke & Badie

[57] ABSTRACT

The rubber-modified styrene-based copolymeric resin of the invention comprises a matrix phase of a copolymer of styrene and acrylonitrile and a dispersed phase of particles of an S-B type block-copolymeric rubber of styrene and butadiene as prepared by the bulk-suspension polymerization method or continuous bulk polymerization of the monomers in the presence of the rubber. The rubber-modified styrene-based copolymeric resin is imparted with excellent rigidity, impact strength and appearance, in particular, in welded portions when it is prepared by adequately selecting several parameters including the weight proportion of the moieties derived from styrene and acrylonitrile in the matrix phase and content of styrene, solution viscosity, content of 1,2-unsaturated linkages, particle size and distribution thereof in the rubber constituting the dispersed phase.

4 Claims, No Drawings

RUBBER-MODIFIED STYRENE-BASED COPOLYMER

This application is a continuation of application Ser. No. 07/460,266 filed Jan. 2, 1990, now abandoned.

BACKGROUND OF THE INVENTION

The present invention relates to a novel rubber-modified styrene-based copolymer or, more particularly, to a rubber-modified styrene-based copolymer suitable as a molding material in injection molding, extrusion molding, extrusion-vacuum forming and the like and capable of giving a molded article having good appearance or, in particular, good appearance in the welded portion as well as excellent rigidity and impact strength.

It is widely practiced in the prior art in the industry of synthetic resins with an object to impart a styrene-based resin with improved impact strength that a rubber-modified polystyrene resin composition is prepared either by blending a polystyrene with a rubbery polymer or by polymerizing styrene in the presence of a rubbery polymer. In the latter method of polymerization, the molecules of the rubbery polymer are grafted with a part of the styrene while the remaining part of the styrene is polymerized into polystyrene so that the resultant product is a composite of the polystyrene and the graft copolymer of styrene on the rubbery polymer.

On the other hand, known rubber-modified styrene-based copolymers include a so-called ABS resin which is a rubber-modifind copolymer of styrene and acrylonitrile. ABS resins have advantages that a very strong adhesion is obtained between the surface of the resin article and a chemical plating layer formed thereon in addition to the greatly improved impact strength and mechanical strengths as compared with polystyrenes as well as excellent moldability so that they are employed in a wide field of applications including machine parts, parts of electric and electronic appliances, parts of automobiles, household commodities, stationery goods and the like.

Rubber-modified copolymers of styrene and acrylonitrile are prepared usually by the method such as bulk-suspension polymerization method, continuous bulk polymerization method, emulsion polymerization method and the like. The methods of bulk-suspension polymerization and continuous bulk polymerization are advantageous, when comparison is made with the emulsion polymerization method performed by using a large amount of emulsifiers, in respect of the excellent productivity to give a high economic merit in addition to the advantage that the post-treatment subsequent to the polymerization involves little problem in the water pollution. A problem in the bulk-suspension polymerization method and continuous bulk polymerization method, however, is that the ABS resin obtained thereby is poor in respect of the balance of properties between appearance and the rigidity or mechanical strengths of the shaped articles.

Proposals have been made to provide an improved rubber-modified styrene-based copolymer free from the above mentioned problems by using a polybutadiene of low solution viscosity (see Japanese Patent Kokai 63-199717) and by using a blockwise copolymeric rubber of S-B type having a low solution viscosity (see Japanese Patent Kokai 63-207863). The former method by using a polybutadiene of low solution viscosity is not always quite satisfactory because the rubber-modified styrene-based copolymer prepared thereby gives shaped articles sometimes having a low rigidity and poor appearance, in particular, in the welded portions. As to the appearance of shaped articles in the welded portions, satisfactory rubber-modified styrene-based copolymers can not always be obtained by the latter method by using an S-B type blockwise copolymeric rubber having a low solution viscosity.

SUMMARY OF THE INVENTION

The present invention accordingly has an object to provide a novel rubber-modified styrene-based copolymer capable of giving a shaped article having excellent rigidity and impact strength as well as good appearance, in particular, in welded portions by overcoming the above described problems and defects in the conventional rubber-modified styrene-based copolymers prepared by the method of bulk-suspension polymerization of continuous bulk polymerization. Thus, the invention provides a rubber-modified styrene-based copolymeric resin comprising a matrix phase consisting of a copolymeric resin of an aromatic monovinyl monomer and a vinyl cyanide monomer and a dispersed phase consisting of particles of a rubbery polymer dispersed in the matrix phase, in which:

(a) the weight ratio of the moiety of the aromatic monovinyl monomer to the moiety of the vinyl cyanide monomer in the copolymeric resin of the matrix phase is in the range from 60:40 to 95:5;

(b) the rubbery polymer is an S-B type copolymeric rubber of styrene and butadiene containing from 23 to 60% by weight of the styrene moiety, of which a 5% by weight solution in styrene has a viscosity in the range from 20 to 60 centipoise at 25° C. and the butadiene segments contain from 5 to 25% by moles of 1,2-vinyl linkages; and (c) the rubbery polymer is dispersed in the matrix of the copolymeric resin in the form of particles having an area-average particle diameter in the range from 0.03 to 0.5 μm in an amount in the range from 3 to 35% by weight based on the rubber-modified styrene-based copolymer, the ratio of the area-average particle diameter to the number-average particle diameter being 2.0 or smaller.

DETAILED DESCRIPTION OF THE PREFERRED EMBODIMENTS

As is described above, the inventive rubber-modified styrene-based copolymer is characterized by the features including (a) the specific weight ratio of the moieties derived from the aromatic monovinyl monomer and the vinyl cyanide monomer in the matrix of the copolymeric resin, (b) the specific solution viscosity and micro structure of the rubbery polymer, and (c) the specific particle diameter and distribution of the particle diameter of the particles of the rubbery polymer dispersed in the matrix of the copolymeric resin.

Examples of the aromatic monovinyl monomer above mentioned include: styrene; α-substituted alkyl styrenes, e.g., α-methyl styrene, α-ethyl styrene, α-methyl-4-methyl styrene and the like; nucleus-substituted alkyl styrenes, e.g., 2-methyl styrene, 3-methyl styrene, 4-methyl styrene, 2,4-dimethyl styrene, 4-ethyl styrene, 2-tert-butyl styrene, 4-tert-butyl styrene and the like; and nucleus-substituted halogenated styrenes, e.g., 2-chlorostyrene, 3-chlorostyrene, 4-chlorostyrene, 4-bromostyrene, dichlorostyrene, dibromostyrene, trichlorostyrene, tribromostyrene, tetrachlorostyrene, tetrabromostyrene, 2-methyl-4-chlorostyrene and the like as well as 4-hydroxy styrene, 2-methoxy styrene, vinyl naphthalene and the like, of which styrene and α-methyl styrene are particularly preferred. These aromatic monovinyl monomers can be used either singly or as a combination of two kinds or more according to need.

Examples of the vinyl cyanide monomer to be copolymerized with the aromatic monovinyl monomer include acrylonitrile, methacrylonitrile, fumaronitrile, maleonitrile, α-chloroacrylonitrile and the like, of which acrylonitrile is particularly preferred. These vinyl cyanide monomers can be used either singly or as a combination of two kinds or more according to need.

The mixing ratio of the above described aromatic monovinyl monomer and the vinyl cyanide monomer in the polymerization mixture should be selected such that the weight ratio of the moiety derived from the aromatic monovinyl monomer to the moiety derived from the vinyl cyanide monomer in the matrix of the copolymeric resin be in the range from 60:40 to 95:5 or, preferably, from 65:35 to 90:10. When the amount of the vinyl cyanide monomer is too small, the mechanical strength of the copolymeric resin is decreased. When the amount thereof is too large, on the other hand, the copolymeric resin has a somewhat decreased heat stability and flowability as a trend.

It is optional according to need that the polymerization mixture of the above described aromatic monovinyl monomer and the vinyl cyanide monomer is further admixed with a third monomer copolymerizable therewith exemplified by unsaturated dicarboxylic acid anhydrides, maleimide derivatives, esters of methacrylic acid, esters of acrylic acid and the like in such an amount that the content of the moiety derived from the third monomer in the copolymeric resin is in the range from 1 to 35% by weight. Examples of the above mentioned unsaturated dicarboxylic acid anhydrides include maleic anhydride, itaconic anhydride, hydroxy maleic anhydride, citraconic anhydride, phenyl maleic anhydride, chloromaleic anhydride and the like, of which maleic anhydride is preferred. Examples of the maleimide derivatives include maleimide, N-phenyl maleimide and the like. Examples of the esters of methacrylic acid include methyl methacrylate and the like. Examples of the esters of acrylic acid include methyl acrylate and the like. These optional monomers can be used either singly or as a combination of two kinds or more according to need.

The rubbery polymer used in the preparation of the inventive styrene-based copolymeric resin is a blockwise copolymeric rubber of styrene and butadiene of the so-called S-B type composed of the segments of styrene and segments of butadiene. The rubbery copolymer should contain from 23 to 60% by weight or, preferably, from 25 to 40% by weight of the styrene moiety. When the content of the styrene moiety is too low, shaped articles prepared from the copolymeric resin would be poor in the appearance and rigidity. When the content of the styrene moiety is too high, on the other hand, shaped articles of the copolymeric resin would have a greatly decreased impact strength.

It is essential that the styrene-butadiene copolymeric rubber has such a degree of polymerization that a 5% by weight solution thereof in styrene has a viscosity in the range from 20 to 60 centipoise or, preferably, from 25 to 50 centipoise at 25° C. When the solution viscosity of the rubbery copolymer is too low, shaped articles of the copolymeric resin would have a decreased impact strength. When the solution viscosity is too high, on the other hand, shaped articles of the copolymeric resin would be poor in the appearance and rigidity. Further, it is essential in the microstructure of the B segments or the butadiene segments in the rubbery copolymer that the content of the 1,2-vinyl linkages is in the range from 5 to 25% by moles or, preferably, from 10 to 22% by moles. When the content of the 1,2-vinyl linkages is too low, the impact strength of the shaped articles of the copolymeric resin would be somewhat decreased while, when the content of the 1,2-vinyl linkages is too high, the impact strength would be greatly decreased. Styrene-butadiene copolymeric rubbers satisfying the above mentioned requirements can be easily prepared in a known method such as those disclosed in Japanese Patent Publications 36-19286, 43-14979 and 49-36957.

It is essential in the rubber-modified styrene-based copolymeric resin of the invention that the above mentioned styrene-butadiene copolymeric rubber is dispersed in the matrix of the copolymeric resin in an amount in the range from 3 to 25% by weight or, preferably, from 6 to 20% by weight based on the overall amount of the rubber-modified styrene-based copolymeric resin in the form of fine particles having an area-average particle diameter in the range from 0.03 to 0.5 μm or, preferably, from 0.10 to 0.4 μm. When the area-average particle diameter thereof is too small, shaped articles of the copolymeric resin would have a decreased impact strength. When the area-average particle diameter is too large, on the other hand, shaped articles of the copolymeric resin would be poor in the appearance and rigidity. When the content of the styrene-butadiene copolymeric rubber is too small, shaped articles of the copolymeric resin cannot be imparted with sufficiently high impact strength. When the content of the rubbery copolymer is too large, on the other hand, a decrease is caused in the rigidity of the shaped articles of the copolymeric resin.

The particle diameter of the styrene-butadiene copolymeric rubber as the dispersed phase can be controlled by adequately selecting the intensity of agitation of the polymerization mixture under polymerization reaction or the copolymeric rubber which should have appropriate properties. For example, the average particle diameter of the rubber particles would be finer as a trend when the polymerization mixture is agitated at a higher intensity or when a copolymeric rubber giving a higher solution viscosity is used.

It is also essential that the particles of the styrene-butadiene copolymeric rubber dispersed in the matrix of the copolymeric resin should have such a particle size distribution that the ratio of the area-average particle diameter to the number-average particle diameter does not exceed 2.0 or, preferably, does not exceed 1.8. When this ratio is too large, shaped articles of the copolymeric resin would be somewhat poor in the appearance and rigidity as a trend.

Further, it is preferable that the particles of the styrene-butadiene copolymeric rubber dispersed in the matrix of the copolymeric resin have a swelling index in a 8:2 by weight solvent mixture of toluene and methyl ethyl ketone, which is a measure for the crosslinked state of the rubber molecules, in the range from 5 to 12. When the swelling index is too small, shaped articles of the copolymeric resin cannot be imparted with sufficiently high impact strength. When the swelling index of the rubber particles is too large, on the other hand shaped articles of the copolymeric resin would also be poor in the impact strength, appearance and rigidity.

The above mentioned swelling index is influenced by the final percentage of monomer conversion, conditions in the process of removal of volatile matters and the like. It is usual that the swelling index is decreased by increasing the final monomer conversion or by increasing the temperature in the stripping process of the volatile matters so that the swelling index can be freely controlled by adequately selecting these conditions.

The rubber-modified styrene-based copolymer of the present invention can be prepared by any method conventionally undertaken in the preparation of similar rubber-modified styrene-based copolymers including the methods of emulsion polymerization, bulk polymerization, bulk-suspension polymerization, suspension polymerization and the like, of which the methods of bulk-suspension polymerization and continuous bulk-polymerization are preferred in the preparation of the inventive copolymeric resin from the standpoint of economic advantages.

Following is a description of the process of a typical method for the preparation of the inventive rubber-modified styrene-based copolymer. In the first place, the styrene-butadiene copolymeric rubber is added to a monomer mixture composed of the aromatic monovinyl monomer and vinyl cyanide monomer with optional mixture of a third monomer copolymerizable therewith and dissolved therein at a temperature of about 20° to 70° C. The thus prepared monomer solution is introduced into a polymerization reactor equipped with a stirrer or, preferably, into the first stage of a sequence of two or more polymerization reactors to effect the polymerization reaction and the polymerization mixture discharged out of the last stage of the reactor sequence is subjected to the step for the separation and removal of the volatile materials such as the unreacted monomers, solvents and the like to obtain a solid material which is the desired copolymeric resin product. While the copolymeric rubber is introduced into the first-stage reactor as dissolved in the monomers, it is optional in the above described process that a part of the monomers and other optional ingredients in the polymerization mixture, such as polymerization initiators and chain transfer agents used according to need, are introduced into the reactor at any stage.

Examples of the polymerization initiator used in this polymerization method according to need include organic peroxides such as tert-butyl hydroperoxide, di-tert-butyl peroxide, cumene hydroperoxide, dicumyl peroxide, benzoyl peroxide, 1,1-bis(tert-butylperoxy) cyclohexane, 1,1-bis-(tert-butylperoxy)-3,3,5-trimethyl cyclohexane, 2,2-bis(4,4-di-tert-butylperoxy cyclohexane) propanone and the like and azo compounds such as azobisisobutyronitrile, azobis-2,4-dimethyl valeronitrile, azobiscyclohexane carbonitrile, methyl azobisisobutyrate, azobiscyano valeric acid and the like.

Examples of the chain transfer agent added to the polymerization mixture according to need include mercaptan compounds such as n-dodecyl mercaptan, tert-dodecyl mercaptan and the like as well as dimer of α-methyl styrene, 1-phenylbutene-2-fluorene, terpinol, chloroform and the like.

The rubber-modified styrene-based copolymeric resin of the invention can be molded and shaped as such into articles but it is optional that the inventive copolymeric resin is compounded with various kinds of known additives conventionally used in styrene-based polymeric resins including, for example, lubricants, antioxidants, plasticizers, flame retardants, photostabilizers, coloring agents and the like as well as fillers such as fibrous ones, e.g., glass fibers, and inorganic particulate ones for the purpose of reinforcement. Examples of the lubricant include stearic acid, behenic acid, stearoamide, methylene bisstearoamide, ethylene bisstearoamide and the like. Examples of the antioxidant include hindered phenolic compounds such as 2,6-di-tert-butyl-4-methyl phenol, stearyl-$\beta$-(3,5-di-tert-butyl-4-hydroxy phenyl) propionate, triethylene glycol bis-3-(3-tert-butyl-4-hydroxy-5-methyl phenyl) propionate and the like and phosphite compounds such as tri(2,4-di-tert-butyl phenyl) phosphite, 4,4'-butylidene bis (3-methyl-6-tert-butylphenyl-di-tridecyl) phosphite and the like. A preferable example of the flame retardant is a combination of an organic halogen compound such as tetrabromo bisphenol A, decabromo diphenyl sulfoxide, brominated polycarbonate and the like and antimony oxide.

It is further optional to prepare a molding compound by blending the inventive rubber-modified styrene-based copolymeric resin with one or more of other resins such as ABS resins, polystyrene, plyvinyl chloride, copolymeric resins of styrene and acrylonitrile, polycarbonate, polybutylene terephthalate, polyethylene terephthalate, nylon-6, nylon-11, nylon-12, polyphenylene oxide, polyphenylene sulfide and the like.

In the following, examples are given to illustrate the present invention in more detail but not to limit the scope of the invention in any way. The copolymeric resin products prepared in the examples were evaluated in the following manner for the respective items.

I. STRUCTURE OF THE STYRENE-BUTADIENE COPOLYMERIC RUBBER (a) Content of Styrene Moiety The method described in Journal of Polymer Science, volume 1, pages 429–433 (1946) was undertaken, according to which the copolymeric rubber was oxidized and decomposed with di-tert-butyl hydroperoxide as the oxidizing agent using osmium tetraoxide as the catalyst.

(b) Micro Structure

The content of the 1,2-vinyl linkage was determined by using an infrared spectrophotometer according to the Morello method described in Chimie et Industrie, volume 41, page 758 (1959).

II. SOLUTION VISCOSITY OF THE STYRENE-BUTADIENE COPOLYMERIC RUBBER

The viscosity of a 5% by weight solution of the rubber in styrene was determined at 25° C. by using a Cannon-Fenske type viscosimeter.

III. RATIO OF THE AREA-AVERAGE PARTICLE DIAMETER TO THE NUMBER-AVERAGE PARTICLE DIAMETER

Electron microscopic photographs were taken of a thin section of a bead or pellet of the copolymeric resin stained with osmium tetraoxide by using an ultramicrotome and ratio was calculated from the diameters of the enlarged images of 400 to 800 rubber particles in the photographs by using the equation given below. When the image of the particle is not circular but elliptic, the diameter D of the particle was assumed to be the average value of the major axis a and minor axis b, i.e. (a+b)/2.

Ratio of area-average particle diameter to number-average particle diameter = $D_s/D_n$, where $D_s$ is the area-average particle diameter given by $D_s$, $\mu m = \Sigma n_i D_i^3 / \Sigma n_i D_i^2$, and $D_n$ is the number-average particle diameter given by $D_n$, $\mu m = \Sigma n_i D_i / \Sigma n_i$, $n_i$ being the number of rubber particles having a particle diameter of $D_i$.

IV. SWELLING INDEX

A 2 g portion of the copolymeric rubber was added to 100 ml of a 8:2 by weight mixture of toluene and methyl ethyl ketone and dispersed therein to dissolve the soluble fraction as far as possible. The dispersion was centrifuged to settle the undissolved fraction and the supernatant was discarded by decantation to determine the weight $W_1$ of the swollen gel. The swollen gel was dried first at room temperature for 12 hours and then at 60° C. for 5 hours in a vacuum desiccator to determine the weight $W_2$ of the dried gel. The swelling index was given by $W_1/W_2$.

V. MELT-FLOW RATE

Determination was made according to the method specified in JIS K 7210.

VI. BICUT SOFTENING POINT

Determination was made according to the method specified in JIS K 7206.

VII. FLEXURAL STRENGTH AND FLEXURAL MODULUS

Determination was made according to the method specified in JIS K 7203.

VIII. IZOD IMPACT STRENGTH

Determination was made according to the method specified in JIS K 7110.

IX. APPEARANCE

A plate of 70 mm width, 270 mm length and 3 mm thickness was shaped from the copolymeric resin by injection molding and the surface gloss of the plate was measured according to the method specified in JIS K 7105 on two points at a distance of 85 mm (point A) and at a distance of 230 mm (point B) from the gate, which was a side gate having a diameter of 3 mm.

X. APPEARANCE IN WELDED PORTION

The copolymeric resin was injection-molded into a metal mold of 100 mm width, 420 mm length and 3 mm thickness from both end portions thereof by using two-point side gates so as to form a welding line at the center and the size of the glossless portion appearing in the vicinity of the welding line was visually estimated. Each gate had a diameter of 3 mm. The results were recorded as an average of the values obtained for the test pieces by five shots each of which was given a rating point of 1 to 4 according to the following criteria.

Point 1: complete absence of glossless part
Point 2: very small glossless part
Point 3: noticeable glossless part
Point 4: large glossless part

EXAMPLE 1

Into the first polymerization reactor of 7.9 liter capacity in a reactor sequence was continuously introduced, at a feed rate of 6 liters per hour, a polymerization mixture composed of:

11.0% by weight of a first S-B type block copolymer of styrene and butadiene SB1 (see Table 1);
56.6% by weight of styrene;
18.9% by weight of acrylonitrile;
12.0% by weight of ethyl benzene;
0.02% by weight of 1,1-bis(tert-butylperoxy)-3,3,5-trimethyl cyclohexane;
0.01% by weight of n-dodecyl mercaptan;
0.07% by weight of Irganox 1076 (a product by Ciba-Geigy Corp.);
and
1.4% by weight of a mineral oil. The first polymerization reactor was kept at a temperature of 110° C. so that the polymerization mixture discharged out of the reactor contained 22% by weight of solid matter.

The polymerization mixture coming from the first polymerization reactor was introduced successively into the second reactor of 8.5 liter capacity, third reactor of 11 liter capacity and fourth reactor of 11 liter capacity and polymerization of the mixture was continued in a temperature range of 110° C. to 180° C. After preheating at a temperature of 230° to 260° C., thereafter, the polymerization mixture was subjected to stripping of the volatile matter in a vacuum vessel to give a rubber-modified styrene-based copolymer as the product in the form of pellets.

The content of the rubbery copolymer SB1 in the thus obtained copolymeric resin was 15.7% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 2 below shows the area-average particle diameter of the dispersed particles when the stirrer velocities of the first and second polymerization reactors were 150 rpm and 200 rpm, respectively, together with the results of other evaluation tests.

EXAMPLE 2

A continuous polymerization run was conducted in substantially the same manner as in Example 1 except that the S-B type copolymeric rubber SB1 was replaced with the same amount of a second S-B type copolymeric rubber, referred to as SB2 hereinbelow, specified in Table 1. The results of the evaluation tests are shown in Table 2.

EXAMPLE 3

The conditions of the continuous polymerization run were substantially the same as in Example 1 except that the polymerization mixture introduced into the first polymerization reactor was composed of:

8.2% by weight of SB1;
58.3% by weight of styrene;
19.5% by weight of acrylonitrile;
12.0% by weight of ethyl benzene;
0.02% by weight of 1,1-bis(tert-butylperoxy)-3,3,5-trimethyl cyclohexane;

0.01% by weight of n-dodecyl mercaptan;
0.07% by weight of Irganox 1076 (supra); and
1.0% by weight of a mineral oil.

The first polymerization reactor was kept at a temperature of 110° C. so that the polymerization mixture discharged out of the first reactor contained 23% by weight of solid matter.

The content of the rubbery copolymer SB1 in the copolymeric resin obtained by the continuous polymerization run was 11.7% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 2 below shows the area-average particle diameter of the dispersed particles when the stirrer velocities of the first and second polymerization reactors were 150 rpm and 200 rpm, respectively, together with the results of other evaluation tests.

EXAMPLE 4

A continuous polymerization run was conducted under substantially the same conditions as in Example 1 except that copolymeric rubber SB1 was replaced with a third S-B type copolymeric rubber, referred to as SB3 hereinbelow, specified in Table 1 and the polymerization mixture introduced into the first polymerization reactor was composed of:
11.5% by weight of SB3;
55.6% by weight of styrene;
18.5% by weight of acrylonitrile;
12.0% by weight of ethyl benzene;
0.02% by weight of 1,1-bis(tert-butylperoxy)-3,3,5-trimethyl cyclohexane;
0.01% by weight of n-dodecyl mercaptan;
0.07% by weight of Irganox 1076 (supra); and
1.4% by weight of a mineral oil.

The first polymerization reactor was kept at a temperature of 110° C. so that the polymerization mixture discharged out of the first reactor contained 24% by weight of solid matter.

The content of the rubbery copolymer SB3 in the copolymeric resin obtained by the continuous polymerization run was 16.4% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 2 below shows the area-average particle diameter of the dispersed particles when the stirrer velocities of the first and second polymerization reactors were 200 rpm and 250 rpm, respectively, together with the results of other evaluation tests.

EXAMPLE 5

A continuous polymerization run was conducted under substantially the same conditions as in Example 1 except that copolymeric rubber SB1 was replaced with a fourth S-B type copolymeric rubber, referred to as SB4 hereinbelow, specified in Table 1 and the polymerization mixture introduced into the first polymerization reactor was composed of:
15.1% by weight of SB4;
52.98% by weight of styrene;
17.3% by weight of acrylonitrile;
14.0% by weight of ethyl benzene;
0.03% by weight of 1,1-bis(tert-butylperoxy)-3,3,5-trimethyl cyclohexane;
0.02% by weight of n-dodecyl mercaptan;
0.07% by weight of Irganox 1076 (supra); and
1.5% by weight of a mineral oil.

The first polymerization reactor was kept at a temperature of 106° C. so that the polymerization mixture discharged out of the first reactor contained 22% by weight of solid matter. The preheating for the volatile matter stripping was conducted at a temperature of 240° to 270° C.

The content of the rubbery copolymer SB4 in the copolymeric resin obtained by the continuous polymerization run was 21.5% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 2 below shows the area-average particle diameter of the dispersed particles when the stirrer velocities of the first and second polymerization reactors were 100 rpm and 150 rpm, respectively, together with the results of other evaluation tests.

EXAMPLE 6

A continuous polymerization run was conducted in about the same manner as in Example 1 except that the feed rate of the starting polymerization mixture was 5.4 liters per hour and the polymerization mixture introduced into the first polymerization reactor was composed of:
12.0% by weight of SB1;
56.98% by weight of styrene;
18.7% by weight of acrylonitrile;
12.0% by weight of ethyl benzene;
0.03% by weight of 1,1-bis(tert-butylperoxy)-3,3,5-trimethyl cyclohexane;
0.02% by weight of n-dodecyl mercaptan;
0.07% by weight of Irganox 1076 (supra); and
1.2% by weight of a mineral oil.

The first polymerization reactor was kept at a temperature of 111° C. so that the polymerization mixture discharged out of the first reactor contained 24% by weight of solid matter. The preheating for volatile matter stripping was conducted at a temperature of 245° to 275° C.

The content of the rubbery copolymer SB1 in the copolymeric resin obtained by the continuous polymerization run was 17.1% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 2 below shows the area-average particle diameter of the dispersed particles when the stirrer velocities of the first and second polymerization reactors were 200 rpm and 250 rpm, respectively, together with the results of other evaluation tests.

EXAMPLE 7

The conditions of the continuous polymerization run were substantially the same as in Example 1 except that maleic anhydride was added to the polymerization mixture as a third monomer so that the polymerization mixture was composed of:

- 10.3% by weight of SB1;
- 52.9% by weight of styrene;
- 17.6% by weight of acrylonitrile;
- 6.5% by weight of maleic anhydride;
- 11.2% by weight of ethyl benzene;
- 0.02% by weight of 1,1-bis(tert-butylperoxy)-3,3,5-trimethyl cyclohexane;
- 0.01% by weight of n-dodecyl mercaptan;
- 0.07% by weight of Irganox 1076 (supra); and
- 1.4% by weight of a mineral oil, and the stirrer velocity in the second polymerization reactor was 250 rpm instead of 200 rpm. The results of the evaluation tests are shown in Table 2.

EXAMPLE 8

A continuous polymerization run was conducted under substantially the same conditions as in Example 1 except that copolymeric rubber SB1 was replaced with a fifth S-B type copolymeric rubber, referred to as SB5 hereinbelow, specified in Table 1 and the polymerization mixture introduced into the first polymerization reactor was composed of:

- 17.7% by weight of SB5;
- 48.6% by weight of styrene;
- 16.2% by weight of acrylonitrile;
- 16.0% by weight of ethyl benzene;
- 0.02% by weight of 1,1-bis(tert-butylperoxy)-3,3,5-trimethyl cyclohexane;
- 0.01% by weight of n-dodecyl mercaptan;
- 0.07% by weight of Irganox 1076 (supra); and
- 1.4% by weight of a mineral oil.

The first polymerization reactor was kept at a temperature of 107° C. so that the polymerization mixture discharged out of the first reactor contained 17% by weight of solid matter. The preheating for volatile matter stripping was conducted at a temperature of 220° to 250° C.

The content of the rubbery copolymer SB5 in the copolymeric resin obtained by the continuous polymerization run was 25.3% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 2 below shows the area-average particle diameter of the dispersed particles when the stirrer velocities of the first and second polymerization reactors were 200 rpm and 250 rpm, respectively, together with the results of other evaluation tests.

TABLE 1

| Copolymeric rubber | Viscosity of styrene solution, centipoise | Content of styrene moiety, % by weight | Content of 1,2-vinyl linkage, % by moles |
|---|---|---|---|
| SB1 | 35 | 35 | 13 |
| SB2 | 56 | 45 | 12 |
| SB3 | 53 | 25 | 10 |
| SB4 | 22 | 34 | 15 |
| SB5 | 30 | 55 | 12 |
| SB6 | 31 | 21 | 20 |
| SB7 | 64 | 35 | 14 |
| SB8 | 13 | 22 | 42 |
| SB9 | 9 | 45 | 17 |
| SB10 | 12 | 21 | 13 |
| PB1 | 38 | 0 | 1 |
| PB2 | 13 | 0 | 13 |

TABLE 2

| | Example | | | | | | | |
|---|---|---|---|---|---|---|---|---|
| | 1 | 2 | 3 | 4 | 5 | 6 | 7 | 8 |
| Copolymeric rubber | SB1 | SB2 | SB1 | SB3 | SB4 | SB1 | SB1 | SB5 |
| Content of rubber in copolymer, % by weight | 10.2 | 8.6 | 7.6 | 12.3 | 14.2 | 11.1 | 10.4 | 11.4 |
| Area-average particle diameter, μm | 0.35 | 0.30 | 0.45 | 0.25 | 0.34 | 0.21 | 0.38 | 0.36 |
| Ratio of area-average particle diameter to number-average particle diameter | 1.5 | 1.6 | 1.3 | 1.7 | 1.8 | 1.3 | 1.6 | 1.8 |
| Swelling index | 10 | 9 | 11 | 12 | 8 | 7 | 7 | 12 |
| Melt-flow rate, g/10 minutes | 4.1 | 4.4 | 4.8 | 3.1 | 2.8 | 3.3 | 2.7 | 4.3 |
| Bicut softening point, °C. | 108.4 | 109.1 | 110.3 | 108.5 | 106.2 | 109.1 | 122.8 | 106.7 |
| Flexural strength, kg/cm² | 765 | 783 | 805 | 740 | 681 | 784 | 932 | 713 |
| Flexural modulus, kg/cm² | 23900 | 29200 | 30700 | 28200 | 27400 | 30400 | 34400 | 27600 |
| Izod impact strength, kg · cm/cm | 10.3 | 9.5 | 8.1 | 13.1 | 13.2 | 11.1 | 9.7 | 10.2 |
| Appearance, % gloss | | | | | | | | |
| point A | 94 | 96 | 96 | 94 | 93 | 96 | 96 | 95 |
| point B | 90 | 93 | 94 | 90 | 91 | 94 | 94 | 91 |
| Appearance in welded portion | 1.2 | 1.2 | 1.2 | 1.4 | 1.6 | 1.2 | 1.2 | 1.4 |

COMPARATIVE EXAMPLE 1

The conditions of the continuous polymerization run were substantially the same as in Example 1 except that the copolymeric rubber SB1 was replaced with a sixth S-B type copolymeric rubber, referred to as SB6 hereinbelow, specified in Table 1 and the polymerization mixture introduced into the first polymerization reactor was composed of:

9.0% by weight of SB6;
58.4% by weight of styrene;
19.5% by weight of acrylonitrile;
12.0% by weight of ethyl benzene;
0.02% by weight of 1,1-bis(tert-butylperoxy)-3,3,5-trimethyl cyclohexane;
0.01% by weight of n-dodecyl mercaptan;
0.07% by weight of Irganox 1076 (supra); and
1.0% by weight of a mineral oil.

The first polymerization reactor was kept at a temperature of 110° C. so that the polymerization mixture discharged out of the first reactor contained 21% by weight of solid matter.

The content of the rubbery copolymer SB6 in the copolymeric resin obtained by the continuous polymerization run was 12.9% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 3 below shows the area-average particle diameter of the dispersed particles when the stirrer velocities of the first and second polymerization reactors were 150 rpm and 200 rpm, respectively, together with the results of other evaluation tests.

COMPARATIVE EXAMPLE 2

A continuous polymerization run was conducted under substantially the same conditions as in Example 1 except that the polymerization mixture introduced into the first polymerization reactor was composed of:

11.0% by weight of SB1;
55.29% by weight of styrene;
18.4% by weight of acrylonitrile;
14.0% by weight of ethyl benzene;
0.03% by weight of 1,1-bis(tert-butylperoxy)-3,3,5-trimethyl cyclohexane;
0.01% by weight of n-dodecyl mercaptan;
0.07% by weight of Irganox 1076 (supra); and
1.2% by weight of a mineral oil.

The first polymerization reactor was kept at a temperature of 111° C. so that the polymerization mixture discharged out of the first reactor contained 27% by weight of solid matter.

The content of the rubbery copolymer SB1 in the copolymeric resin obtained by the continuous polymerization run was 15.7% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 3 below shows the area-average particle diameter of the dispersed particles when the stirrer velocities of the first and second polymerization reactors were each 150 rpm, together with the results of other evaluation tests.

COMPARATIVE EXAMPLE 3

The conditions of the continuous polymerization run were substantially the same as in Example 8 except that the stirrer velocity in the second polymerization reactor was 150 rpm instead of 250 rpm. The results of the evaluation tests of the thus obtained copolymeric resin are shown in Table 3.

COMPARATIVE EXAMPLE 4

The conditions of the continuous polymerization run were substantially the same as in Example 1 except that the S-B type copolymeric rubber was replaced with a first polybutadiene, referred to as PB1 hereinbelow, specified in Table 1 and the polymerization mixture introduced into the first polymerization reactor was composed of:

7.4% by weight of PB1;
59.29% by weight of styrene;
19.8% by weight of acrylonitrile;
12.0% by weight of ethyl benzene;
0.03% by weight of 1,1-bis(tert-butylperoxy)-3,3,5-trimethyl cyclohexane;
0.01% by weight of n-dodecyl mercaptan;
0.07% by weight of Irganox 1076 (supra); and
1.4% by weight of a mineral oil.

The first polymerization reactor was kept at a temperature of 106° C. so that the polymerization mixture discharged out of the first reactor contained 22% by weight of solid matter. The preheating for volatile matter stripping was conducted at a temperature of 245° to 275° C.

The content of the rubbery copolymer PB1 in the copolymeric resin obtained by the continuous polymerization run was 10.5% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 3 below shows the area-average particle diameter of the dispersed particles when the stirrer velocities of the first and second polymerization reactors were 20 rpm and 250 rpm, respectively, together with the results of other evaluation tests.

COMPARATIVE EXAMPLE 5

The conditions of the continuous polymerization run were substantially the same as in Example 1 except that the copolymeric rubber SB1 was replaced with a seventh S-B type copolymeric rubber, referred to as SB7 hereinbelow, specified in Table 1 and the polymerization mixture introduced into the first polymerization reactor was composed of:

10.3% by weight of SB7;
57.2% by weight of styrene;
19.0% by weight of acrylonitrile;
12.0% by weight of ethyl benzene;
0.02% by weight of 1,1-bis(tert-butylperoxy)-3,3,5-trimethyl cyclohexane;
0.01% by weight of n-dodecyl mercaptan;
0.07% by weight of Irganox 1076 (supra); and
1.4% by weight of a mineral oil.

The first polymerization reactor was kept at a temperature of 110° C. so that the polymerization mixture discharged out of the first reactor contained 21% by weight of solid matter. The preheating for volatile matter stripping was conducted at a temperature of 240° to 270° C.

The content of the rubbery copolymer SB7 in the copolymeric resin obtained by the continuous polymerization run was 14.8% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 3 below shows the area-average particle diameter of the dispersed particles when the stirrer velocities of the first and second polymerization reactors were 100 rpm and 130 rpm respectively, together with the results of other evaluation tests.

COMPARATIVE EXAMPLE 6

The conditions of the continuous polymerization run were substantially the same as in Example 1 except that the copolymeric rubber SB1 was replaced with a eighth S-B type copolymeric rubber, referred to as SB8 hereinbelow, specified in Table 1 and the stirrer velocity in the second polymerization reactor was 150 rpm instead of 200 rpm. The result was that the copolymeric rubber could not be dispersed to form fine rubber particles so that no evaluation tests were undertaken for the copolymeric resin product.

COMPARATIVE EXAMPLE 7

The conditions of the continuous polymerization run were substantially the same as in Example 1 except that the copolymeric rubber SB1 was replaced with a ninth S-B type copolymeric rubber, referred to as SB9 hereinbelow, specified in Table 1 and the stirrer velocity in the second polymerization reactor was 100 rpm instead of 200 rpm. The results of the evaluation tests of the thus obtained copolymeric resin are shown in Table 3.

COMPARATIVE EXAMPLE 8

The conditions of the continuous polymerization run were substantially the same as in Example 1 except that the copolymeric rubber SB1 was replaced with a tenth S-B type copolymeric rubber, referred to as SB10 hereinbelow, specified in Table 1. The results of the evaluation tests of the thus obtained copolymeric resin are shown in Table 3.

COMPARATIVE EXAMPLE 9

The conditions of the continuous polymerization run were substantially the same as in Example 7 except that the copolymeric rubber SB1 was replaced with the copolymeric rubber SB10. The results of the evaluation tests of the thus obtained copolymeric resin are shown in Table 3.

COMPARATIVE EXAMPLE 10

The conditions of the continuous polymerization run were substantially the same as in Example 1 except that the S-B type copolymeric rubber SB1 was replaced with a second polybutadiene, referred to as PB2 hereinbelow, specified in Table 1 and the polymerization mixture introduced into the first polymerization reactor was composed of:

9.1% by weight of PB2;
58.0% by weight of styrene;
19.38% by weight of acrylonitrile;
12.0% by weight of ethyl benzene;
0.03% by weight of 1,1-bis(tert-butylperoxy)-3,3,5-trimethyl cyclohexane;
0.02% by weight of n-dodecyl mercaptan;
0.07% by weight of Irganox 1076 (supra); and
1.4% by weight of a mineral oil.

The first polymerization reactor was kept at a temperature of 106° C. so that the polymerization mixture discharged out of the first reactor contained 22% by weight of solid matter.

The content of the rubbery copolymer PB2 in the copolymeric resin obtained by the continuous polymerization run was 13.0% by weight as estimated from the amount of the starting materials introduced into the reactor and the amount of the copolymeric resin obtained as the product. The area-average particle diameter of the rubber particles dispersed in the matrix of the copolymeric resin could be controlled by adequately selecting the stirrer velocities of the first and second polymerization reactors. Table 3 below shows the area-average particle diameter of the dispersed particles when the stirrer velocities of the first and second polymerization reactors were 150 rpm and 200 rpm, respectively, together with the results of other evaluation tests.

TABLE 3

| | Comparative Example | | | | | | | | | |
|---|---|---|---|---|---|---|---|---|---|---|
| | 1 | 2 | 3 | 4 | 5 | 6 | 7 | 8 | 9 | 10 |
| Copolymeric rubber | SB6 | SB1 | SB5 | PB1 | SB7 | SB8 | SB9 | SB10 | SB10 | PB2 |
| Content of rubber in copolymer, % by weight | 10.2 | 10.2 | 11.4 | 10.5 | 9.6 | 12.1 | 3.6 | 12.4 | 12.4 | 13.0 |
| Area-average particle diameter, $\mu$m | 0.33 | 0.35 | 0.65 | 0.80 | 0.68 | — | 0.39 | 0.22 | 0.23 | 0.23 |
| Ratio of area-average particle diameter to number-average particle diameter | 1.5 | 2.2 | 1.9 | 2.1 | 1.8 | — | 1.8 | 2.1 | 2.3 | 1.4 |
| Swelling index | 10 | 11 | 14 | 12 | 9 | — | 14 | 12 | 11 | 12 |
| Melt-flow rate, g/10 minutes | 3.8 | 3.9 | 4.1 | 3.2 | 4.4 | — | 4.6 | 3.9 | 2.8 | 3.8 |
| Bicut softening point, °C. | 105.4 | 105.3 | 104.6 | 104.1 | 105.1 | — | 104.0 | 103.2 | 114.3 | 104.0 |
| Flexural strength, kg/cm$^2$ | 641 | 632 | 629 | 622 | 631 | — | 620 | 618 | 827 | 604 |
| Flexural modulus, kg/cm$^2$ | 26500 | 26400 | 25800 | 25200 | 26300 | — | 25200 | 25500 | 31900 | 25000 |
| Izod impact strength, kg · cm/cm | 7.1 | 9.2 | 8.4 | 8.3 | 7.3 | — | 6.5 | 10.5 | 8.9 | 12.7 |
| Appearance, % gloss | | | | | | | | | | |
| point A | 82 | 93 | 86 | 85 | 87 | — | 88 | 93 | 93 | 91 |
| point B | 76 | 82 | 73 | 72 | 77 | — | 76 | 80 | 78 | 78 |

TABLE 3-continued

|  | Comparative Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Appearance in welded portion | 3.4 | 3.2 | 3.8 | 4.0 | 3.6 | — | 3.6 | 3.6 | 3.8 | 3.6 |

What is claimed is:

1. A rubber-modified styrene-based copolymeric resin comprising a matrix phase consisting of a copolymeric resin of an aromatic monovinyl monomer and a vinyl cyanide monomer and a dispersed phase consisting of particles of a rubbery polymer dispersed in the matrix phase, in which:
   (a) the weight ratio of the moiety of the aromatic monovinyl monomer to the moiety of the vinyl cyanide monomer in the copolymeric resin of the matrix phase is in the range from 60:40 to 95:5;
   (b) the rubbery polymer is an S-B type block-copolymeric rubber of styrene and butadiene, which rubbery polymer is free of graft copolymers, containing from 25 to 40% by weight of the styrene moiety, of which a 5% by weight solution in styrene has a viscosity in the range from 20 to 60 centipoise at 25° C. and the butadiene segments contain from 5 to 25% moles of 1,2-vinyl linkages, and
   (c) the rubbery polymer is dispersed in the matrix of the copolymeric resin of the aromatic monovinyl monomer and the vinyl cyanide monomer in the form of particles having an area-average particle diameter in the range from 0.03 to 0.5 µm in an amount in the range from 3 to 35% by weight based on the rubber-modified styrene-based copolymer, the ratio of the area-average particle diameter to the number-average particle diameter being 2.0 or smaller.

2. The rubber-modified styrene-based copolymeric resin as claimed in claim 1 wherein the aromatic monovinyl monomer is styrene.

3. The rubber-modified styrene-based copolymeric resin as claimed in claim 1 wherein the vinyl cyanide monomer is acrylonitrile.

4. The rubber-modified styrene-based copolymeric resin as claimed in claim 1 wherein the S-B type block-copolymeric rubber of styrene and butadiene has a swelling index in the range from 5 to 12 as measured in a 8:2 by weight mixture of toluene and methyl ethyl ketone.

* * * * *